Dec. 6, 1966   F. SCHEFFLER   3,290,476
CHAIN CONVEYOR FOR PARTS SUBJECTED TO INDUCTION HEATING
Filed Sept. 21, 1964
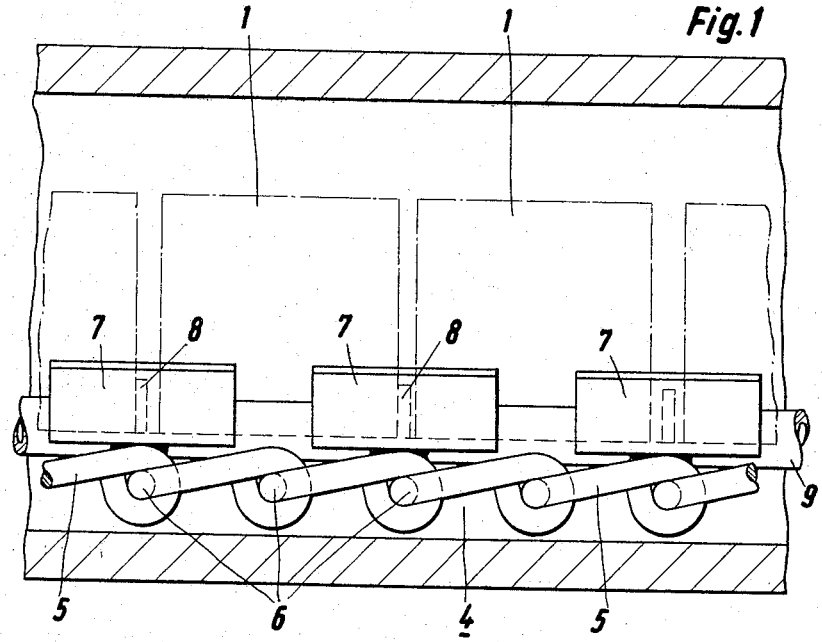
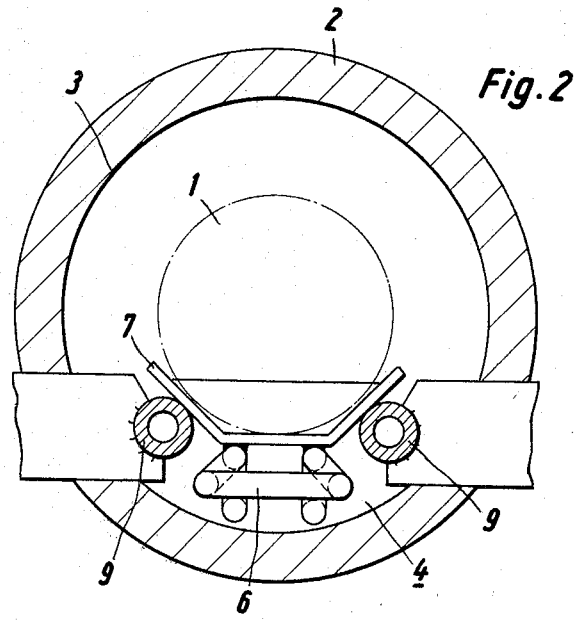
Inventor:
Friedrich Scheffler
By Cushman, Darby & Cushman
Attorneys

United States Patent Office 3,290,476
Patented Dec. 6, 1966

3,290,476
CHAIN CONVEYOR FOR PARTS SUBJECTED TO INDUCTION HEATING
Friedrich Scheffler, Remscheid, Germany, assignor to Deutsche Edelstahlwerke Aktiengesellschaft, Krefeld, Germany, and Allgemeine Elektricitats-Gesellschaft, Berlin-Grunewald, Germany
Filed Sept. 21, 1964, Ser. No. 398,025
Claims priority, application Germany, Sept. 28, 1963, D 42,584
1 Claim. (Cl. 219—10.69)

The invention relates to chain conveyors for carrying non-magnetic non-ferrous metal parts that are to be subjected to an induction heating treatment, particularly parts made of aluminium and copper and of their alloys, through the induction coil.

As such it is known to conduct metal parts which are to be inductively heated through induction coils on chains. If the parts are made of iron, iron alloys or other ferromagnetic metals, no difficulty arises. Care must merely be taken to ensure that the chains themselves are not unduly heated in the magnetic field of the inductor.

However, considerable difficulties are encountered if the parts taken through the induction coil are made of non-magnetic non-ferrous metals because the magnetic field urges the parts axially out of the coil if the turns of the inductor coil embrace the parts as is conventional. The lower the frequency of the inductor the greater is the force of repulsion which acts on the parts in the axial direction. In known equipment for inductively heating non-ferrous metals, pusher devices and counterholders are therefore provided for keeping the parts in position, but from the point of view of providing an unimpeded flow of the treated parts axially through the coil their presence is a major inconvenience. The parts tend to close together in the axial direction and to form a solid column from which it is practically impossible to remove a part, and into which it is similarly impossible to insert an additional part. If it is desired to take out a part the power of the coil must be either shut down completely or at least considerably reduced to permit the counterholder to release the leading part that has already been raised to the required temperature. This is a nuisance and undesirable because the continuity of the process of heating is constantly interrupted. The expenditure of electrical and mechanical power is considerable.

For this reason chains have not in the past been used for conveying workpieces made of non-ferrous metals since the described circumstances prevent the advantages of a chain conveyor from being effectively utilised.

It is the object of the present invention to provide appropriate means for rendering chain conveyors suitable for carrying non-magnetic non-ferrous parts through induction heating equipment. More particularly it is the aim of the invention to prevent the parts from shifting on the conveyor chain without the need of counterholders or the like being applied to them from the outside. It is also the object of the invention to permit the parts to be removed from the travelling chain without requiring the power of the induction coil to be first shut down or reduced.

According to the invention the problem is solved by providing compartments for the reception of the treated parts, so contrived that the parts inserted therein are substantially unable to shift. Conveniently these compartments are formed by pins, rungs or webs which project longitudinally and transversely from the top of the chain. The presence of such pins, rungs or webs does not affect the action of the coil and they readily run over the returns of the chain. Moreover, they may be so arranged that they can accommodate round sections, whether short or long, as well as plate shaped work which is conducted through the coil edge up. In any case the pins, rungs and webs may be so located that the workpiece can neither fall off the chain nor significantly shift on the chain in the axial direction. The proposed arrangement effectively prevents the magnetic forces which exist in the coil from pushing the parts axially closely together in the form of a solid longitudinal column.

In a particularly useful arrangement transverse webs and trough or shell-like aprons are associated with a link of the chain for the reception of the treated work.

A preferred embodiment of the invention is illustratively shown in the drawings in which:

FIG. 1 is a side elevation, and
FIG. 2 a vertical cross section of a conveyor chain according to the invention.

In the illustrated embodiment it is assumed that it is desired to convey cylindrical workpieces 1 through an inductor 2 which has an internal contour represented by a circle 3.

The chain 4 for conveying these workpieces consists of a sequence of links 5 made of wire articulated together by appropriately bending the wire. The points of articulation are indicated at 6. Instead of a conventional chain of this kind any other type of chain might be used. It would also be feasible to replace the chain by a sheet metal band to which web members, pins or rungs are attached. Hence, when reference is made in this specification and the claims hereof to a conveyor chain this is intended to include an endless band or the like.

For the reception of the workpieces 1 in the drawing trough or shell-like aprons and transverse web members 8 are provided. One apron 7 and one web member 8 are associated with a link 5 or links of the chain and in the embodiment illustrated in FIG. 1 an apron and a transverse web are associated with each other link. They are attached to the link by welding. The aprons 7 could be longer than shown in the drawing and in fact they might extend to the middle of each of the neighbouring links. However, conveniently they should be as short as possible in order to introduce as little additional material into the interior of the inductor where such material would likewise be heated.

The aprons 7 are slidably guided on each side by tubes 9 which pass axially through the induction coil and which are internally cooled by a liquid.

The shape of the aprons 7 permits the workpieces to be conveniently received into the same and to be just as easily tipped out or removed in some other way after they have been heated. Any shifting of the workpieces in the axial direction of the coil, that is to say in the direction in which the chain travels, is effectively prevented by the presence of the transverse webs 8. Each two webs in conjunction with the facing halves of two aprons form a compartment which holds the workpiece 1 in a manner substantially preventing displacement whilst it passes through the inductor.

It will be readily understood that for the reception of workpieces of other shapes the side cheeks of the aprons 7 could be formed by pins or the like which in conjunction with the transverse webs 8 likewise define separate compartments for the reception of the parts that are to be treated. According to requirements the transverse web members 8 could even be replaced by verical pins.

The chain and the parts connected thereto preferably consist of a non-ferromagnetic material, as is conventional.

What I claim is:

An inductive heating apparatus comprising an inductor, a heating zone and an endless chain conveyor for workpieces of non-magnetic, non-ferrous metal that are to be inductively heated, said conveyor having means attached thereto forming compartments at the top of the conveyor at the heating zone for supporting and locating the workpieces against significant shifting during conveyance through the heating zone, said compartment-forming means comprising spaced open-ended trough-like supports with diverging side cheeks for the workpieces carried by the conveyor and comprising medial division means for separating and locating workpieces aligned along the conveyor.

References Cited by the Examiner

UNITED STATES PATENTS

| | | | |
|---|---|---|---|
| 2,490,206 | 12/1949 | Calley | 219—10.69 |
| 2,676,234 | 4/1954 | Lackner et al. | 219—10.67 |
| 2,819,370 | 1/1958 | Osborn | 219—10.67 |
| 2,823,289 | 2/1958 | Beck | 219—10.41 |
| 2,888,125 | 5/1959 | Engelson et al. | 198—20 |
| 3,051,811 | 8/1962 | Koesling | 219—10.67 |

FOREIGN PATENTS

| | | |
|---|---|---|
| 1,844,585 | 8/1958 | Germany. |

RICHARD M. WOOD, *Primary Examiner.*

ANTHONY BARTIS, *Examiner.*

L. H. BENDER, *Assistant Examiner.*